(12) United States Patent
Katsurada et al.

(10) Patent No.: US 9,197,150 B2
(45) Date of Patent: Nov. 24, 2015

(54) VEHICULAR CHARGING SYSTEM

(71) Applicant: Mitsubishi Electric Corporation, Chiyoda-ku, Tokyo (JP)

(72) Inventors: Keisuke Katsurada, Chiyoda-ku (JP); Wakaki Miyaji, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/249,629

(22) Filed: Apr. 10, 2014

(65) Prior Publication Data

US 2015/0115903 A1    Apr. 30, 2015

(30) Foreign Application Priority Data

Oct. 30, 2013    (JP) ................................. 2013-224925

(51) Int. Cl.
*H02P 9/00*    (2006.01)
*H02P 11/00*    (2006.01)
*H02P 9/04*    (2006.01)
*H02J 1/00*    (2006.01)

(52) U.S. Cl.
CPC .... *H02P 9/04* (2013.01); *H02J 1/00* (2013.01)

(58) Field of Classification Search
CPC .............. H02P 9/00; H02P 9/48; H02P 11/00
USPC ........................... 322/59, 24, 28, 44; 307/10.1
See application file for complete search history.

(56) References Cited

U.S. PATENT DOCUMENTS

| | | | |
|---|---|---|---|
| 5,528,148 A * | 6/1996 | Rogers | 320/137 |
| 8,602,141 B2 * | 12/2013 | Yee et al. | 180/65.21 |
| 2014/0001987 A1 | 1/2014 | Okada | |
| 2015/0008889 A1 * | 1/2015 | Hayashi et al. | 322/24 |

FOREIGN PATENT DOCUMENTS

| | | |
|---|---|---|
| JP | 2012-196104 A | 10/2012 |
| JP | 2014-50272 A | 3/2014 |
| WO | WO 2013/153630 A1 * | 10/2013 |

OTHER PUBLICATIONS

Communication dated Aug. 19, 2014, issued by the Japan Patent Office in counterpart Japanese Application No. 2013-224925.

* cited by examiner

*Primary Examiner* — Julio Cesar Gonzalez
(74) *Attorney, Agent, or Firm* — Sughrue Mion, PLLC; Richard C. Turner

(57) ABSTRACT

A vehicular charging system includes: a generator which has a field coil and is mounted on a vehicle; a storage battery which stores power; a storage state detection sensor which detects a charge state; and a power generation driving torque control device which calculates an actual value and a target value of power generation driving torque of the generator, and controls the generator based on the calculated target value. The power generation driving torque control device controls the generator based on a first target value of the power generation driving torque when a running state of the vehicle moves into a deceleration mode, and decreases the power generation driving torque to control the generator based on a second target value of the power generation driving torque when a charge state of the storage battery reaches a reference value, the second target value being smaller than the first target value.

10 Claims, 11 Drawing Sheets

VEHICULAR CHARGING SYSTEM

BACKGROUND OF THE INVENTION

1. Field of the Invention

The present invention relates to a vehicular charging system which stores power generation power of a vehicular generator in a storage battery.

2. Description of the Related Art

A vehicular generator is connected to an internal combustion engine via a belt. Power generated by the vehicular generator during deceleration of a vehicle is stored in a storage battery. In a vehicular charging system of recent years, there has been widely adopted a method of suppressing the amount of power generation of the vehicular generator when a driver steps on an accelerator pedal (for example, Patent Document 1). Furthermore, in the case of coasting without stepping on the accelerator pedal or in the case of decelerating the vehicle by stepping on a brake pedal, the amount of power generation of the vehicular generator is made to increase to rapidly charge the storage battery.

In the case of rapidly charging, the amount of power supply to the storage battery is small in a state where the storage battery is close to full charge; and thus, power generation power of an alternating current (AC) generator which is equipped in the vehicle is also small and power generation driving torque generated by the vehicular AC generator is also small. On the contrary, the amount of power supply is needed largely in a state where the amount of charge of the storage battery is deficient; and thus, the power generation power of the vehicular generator also becomes large and the power generation driving torque also becomes large.

As described above, in the vehicular charging system which adopts the method of rapidly charging the storage battery, the power generation driving torque of the vehicular generator fluctuates during the rapid charge depending on the charge state of the storage battery. Deceleration torque of the internal combustion engine also fluctuates due to the fluctuation; and thus, vehicle idle running feeling at the time of separating from the accelerator pedal and vehicle deceleration feeling at the time of stepping on the brake pedal, both feeling being felt by the driver, differ depending on the charge state of the storage battery. In order to avoid this point, when the amount of power generation of the vehicular generator is made to directly increase, the storage battery becomes an overcharge state.

[Patent Document 1] Japanese Unexamined Patent Publication No. 2012-196104.

BRIEF SUMMARY OF THE INVENTION

The invention has been made to solve the problem described above, and an object of the present invention is to stabilize power generation driving torque of a vehicular generator during deceleration of a vehicle and to suppress the influence on drivability of a driver to the minimum.

According to the present invention, there is provided a vehicular charging system including: a generator which has a field coil and is mounted on a vehicle; a storage battery which stores power generated by the generator; a storage state detection sensor which detects a charge state of the storage battery; and a power generation driving torque control device which calculates an actual value of power generation driving torque of the generator from a duty factor with respect to the field coil, calculates a target value of the power generation driving torque of the generator from a running state of the vehicle, and controls the generator based on the calculated target value of the power generation driving torque. The power generation driving torque control device controls the generator based on a first target value of the power generation driving torque when the running state of the vehicle moves into a deceleration mode, and decreases the power generation driving torque to control the generator based on a second target value of the power generation driving torque when the charge state of the storage battery reaches a reference value, the second target value being smaller than the first target value.

According to the present invention, the storage battery is avoided from becoming an overcharge state and the power generation driving torque of the generator during deceleration of the vehicle stabilizes. Further, the influence on drivability of a driver can be suppressed to the minimum.

The foregoing and other objects, features, and advantageous effects of the present invention will become more apparent from detailed description in the following embodiments and description in the accompanying drawings.

DETAILED DESCRIPTION OF THE INVENTION

Hereinafter, embodiments of a vehicular charging system according to the present invention will be described in detail with reference to drawings. Incidentally, the present invention is not limited to the following description, but can be appropriately changed without departing from the spirit or scope of the present invention. The same reference letters or numerals are given to those identical or equivalent to members and portions in the respective drawings.

Embodiment 1

Figure 1:
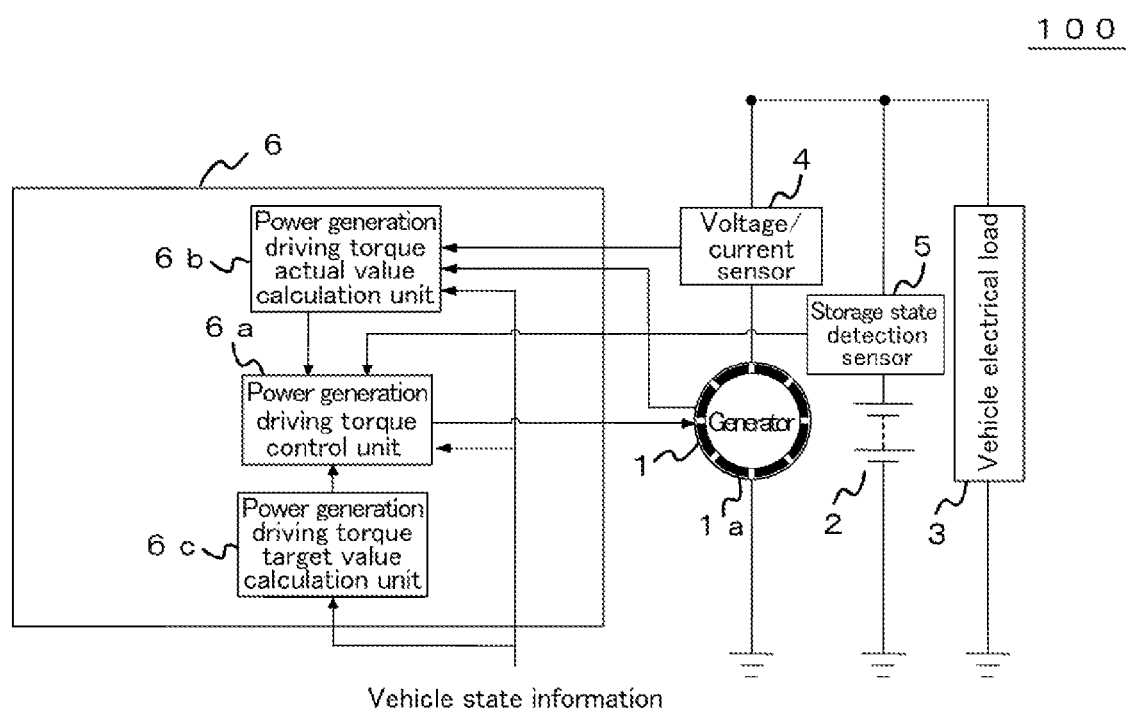
FIG. 1 is a view representing the whole configuration of a vehicular charging system according to Embodiment 1.

FIG. 1 shows a vehicular charging system 100 according to Embodiment 1 of the present invention. A generator 1 equipped with a field coil 1a is mounted on a vehicle. The generator 1 is often driven by an internal combustion engine of the vehicle via a belt; however, the generator 1 also includes those directly driven by a driving system (driving wheels, steering wheels, a drive shaft, a transmission, and the like). Power generation power sent from the generator 1 is supplied to a storage battery 2 and a vehicle electrical load 3. The vehicle electrical load 3 means: loads which are necessary for driving the vehicle and the internal combustion engine; and electrical loads in which a driver arbitrarily operates, for example, a head lamp and an air conditioner. A voltage/current sensor 4 is connected in series to the generator 1 in the vicinity of the generator 1 and monitors an output terminal voltage and an output current of the generator 1. Information monitored by the voltage/current sensor 4 is sent to a power generation driving torque control device 6. A storage state detection sensor 5 detects a charge state (charging rate) of the storage battery 2 and sends the information to the power generation driving torque control device 6.

The power generation driving torque control device 6 is composed of a power generation driving torque control unit 6a, a power generation driving torque actual value calculation unit 6b, and a power generation driving torque target value calculation unit 6c. The power generation driving torque control unit 6a monitors a running state of the vehicle from vehicle state information (the speed of the vehicle, an accelerator opening degree, the amount of stepping on brake, and the like). The power generation driving torque control unit 6a sends a command that increases the amount of power generation to the generator 1 during engine brake at which the driver does not step on an accelerator pedal and/or during transition to a deceleration mode in the case of decelerating the vehicle by stepping on a brake pedal.

The power generation driving torque actual value calculation unit 6b calculates an actual value of power generation driving torque of the generator 1 based on an energization current and a duty factor to the field coil 1a of the generator 1. At this time, the information from the voltage/current sensor 4, the rotation speed of the internal combustion engine (or the generator 1), or a temperature information value of the generator serves as one of calculation parameters; and thus, calculation accuracy of the actual value of the power generation driving torque is improved.

The power generation driving torque target value calculation unit 6c calculates a target value of the power generation driving torque from the information of the speed of the vehicle or the like, the target value being to be covered by the generator with respect to the internal combustion engine in each of the vehicle state. The power generation driving torque control unit 6a compares the actual value of the power generation driving torque with the target value of the power generation driving torque and issues an increase command, a decrease command, or a suppression command of the amount of power generation to the generator 1.

The power generation driving torque control unit 6a determines whether or not the vehicle transitions to a state in the deceleration mode from the vehicle state information, and performs the increase command of the amount of power generation to the generator 1 when the vehicle transitions to the deceleration mode. In order to increase the amount of power generation, there exist a method of increasing power generation voltage of the generator 1 and a method of directly increasing the amount of current flowing in the field coil 1a of the generator 1. The power generation driving torque control unit 6a can know the charging rate of the storage battery 2 by the information from the storage state detection sensor 5.

When the charging rate of the storage battery 2 is low, the amount of power supply to the storage battery 2 is large; and accordingly, the power generation driving torque of the generator 1 naturally increases. Next, when the power generation driving torque increases and the actual value of the power generation driving torque from the power generation driving torque actual value calculation unit 6b is higher than the target value of the power generation driving torque, the power generation driving torque control unit 6a suppresses the amount of power generation of the generator 1. When the charging rate of the storage battery 2 is high, the amount of power supply to the storage battery 2 is small and an increase in the power generation driving torque of the generator 1 is small.

Figure 2:
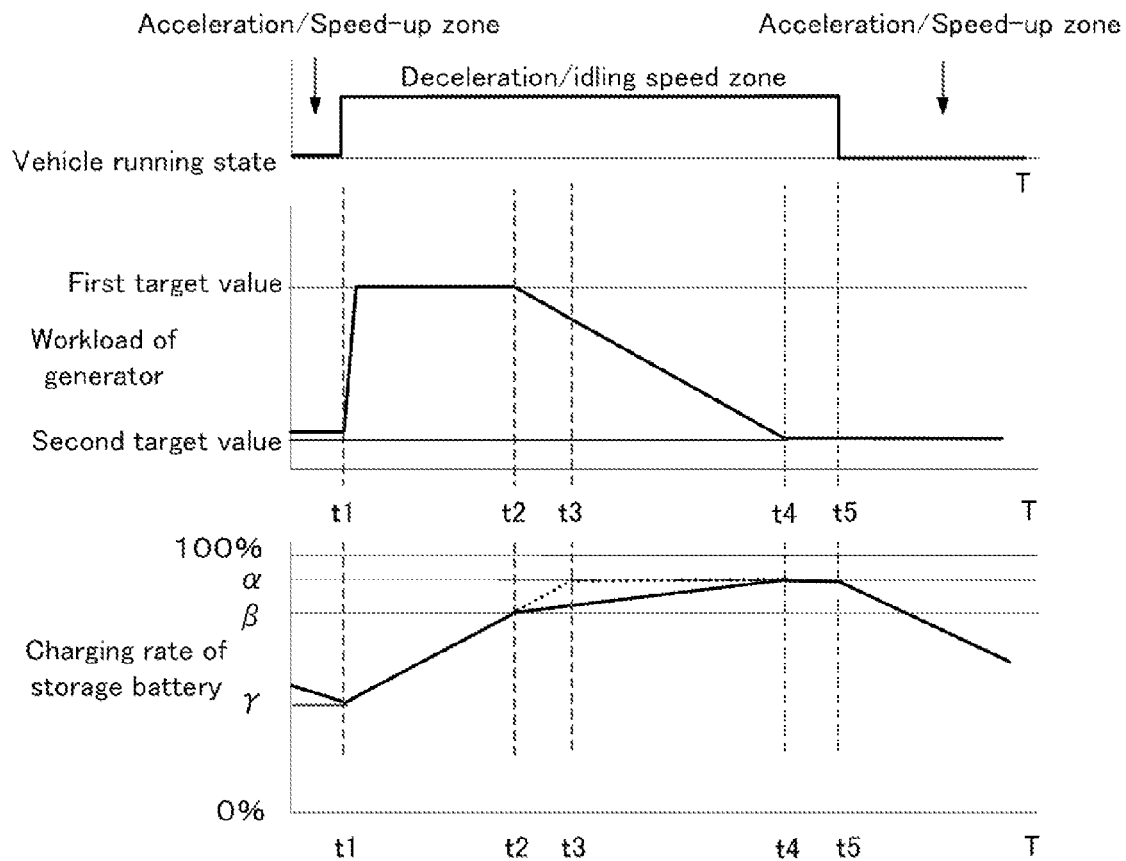
FIG. 2 is a view showing a time chart for explaining the role of the vehicular charging system according to Embodiment 1.

FIG. 2 shows a time chart according to Embodiment 1. The amount of work of the generator correlates with the power generation driving torque of the generator 1. The vehicle first transitions from an acceleration (or speed-up) zone to a deceleration (or idling speed) zone at a time t1 and maintains in the deceleration mode until a time t5. A charging rate γ of the storage battery at the time t1 is lower than a second reference value β (for example, 80%); and the power generation driving torque of the generator 1 naturally increases and reaches a first target value (for example, 100%) of the power generation driving torque. The charging rate begins to rise at the time t1 with an increase in the power generation driving torque of the generator 1. If the charging rate increases in this gradient, the storage battery 2 reaches a first reference value α (for example, 95%) at a time t3; however, the charging rate of the storage battery reaches the second reference value β (for example, 80%) at a time t2 before reaching the first reference value α. In this case, the first reference value α can be set to 100% (a full charge state).

When the charging rate of the storage battery 2 is upcoming to full charge, the power generation driving torque control device 6a performs pulse width modulation (PWM) control so as to be less than or equal to a predetermined difference (in this case, less than or equal to 5%) by detecting the difference between the charging rate and the actual value during the full charge. At this time, the power generation driving torque gradually decreases from the first target value to a second target value. The decrease can be made in a linear or non-linear manner. In either case, an increase rate of the charging rate of the storage battery (and a gradient of an increase in the amount of power generation of the generator) becomes gradual from the time t2; and accordingly, a time until reaching the full charge is prolonged. The charging rate of the storage battery reaches the first reference value α at a time t4. The power generation driving torque target value calculation unit 6c sets the target value of the power generation driving torque to the second target value so as to maintain the first reference value. After that, the vehicle drops out of the deceleration (or idling speed) zone and transitions to the acceleration zone at the time t5.

Figure 3:
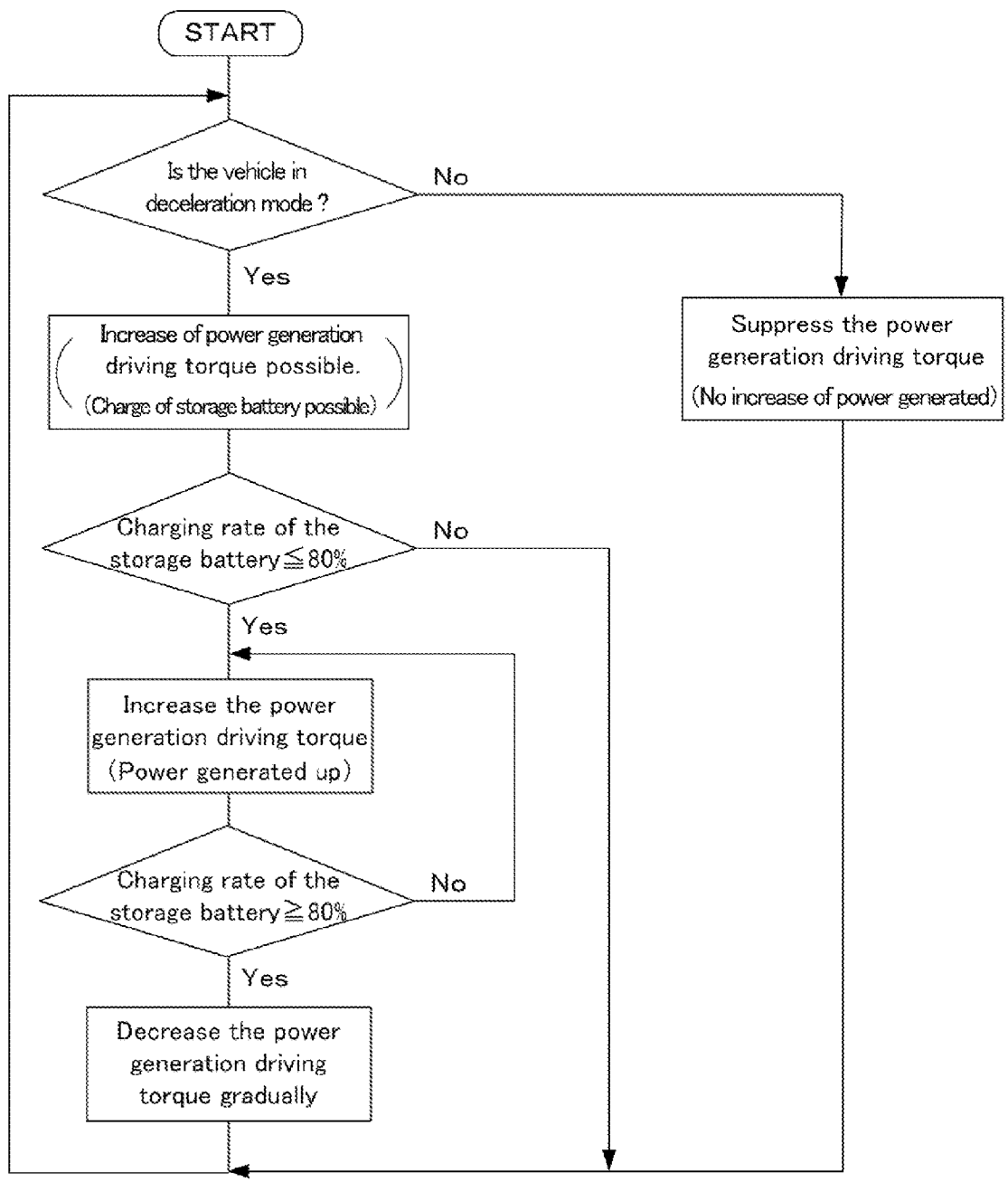
FIG. 3 is a view showing a flow chart according to Embodiment 1.

FIG. 3 shows a flow chart according to Embodiment 1. Except for the deceleration mode, the power generation driving torque control device 6 suppresses the amount of power generation of the generator 1. If the vehicle is in the deceleration mode, the power generation driving torque control device 6 increases the power generation driving torque to be in a state capable of charging the storage battery. If the charging rate of the storage battery is higher than 80% (or the second reference value β), the process returns to start; however, if the charging rate of the storage battery is lower than 80% (or the second reference value β), the power generation driving torque control device 6 increases the power generation driving torque to increase the amount of power generation of the generator. In the case of increasing the power generation driving torque, the generator is preferable to be in a full output state in order to effectively perform regenerative charging. This step that increases the amount of power generation of the generator is repeated until the charging rate of the storage battery reaches 80% (or the second reference value β). If the charging rate of the storage battery reaches 80% (or the second reference value β), control is performed so that the power generation driving torque gradually decreases. If the charging rate of the storage battery reaches 95% (or the first reference value α), the power generation driving torque is maintained at the second target value.

Figure 4:
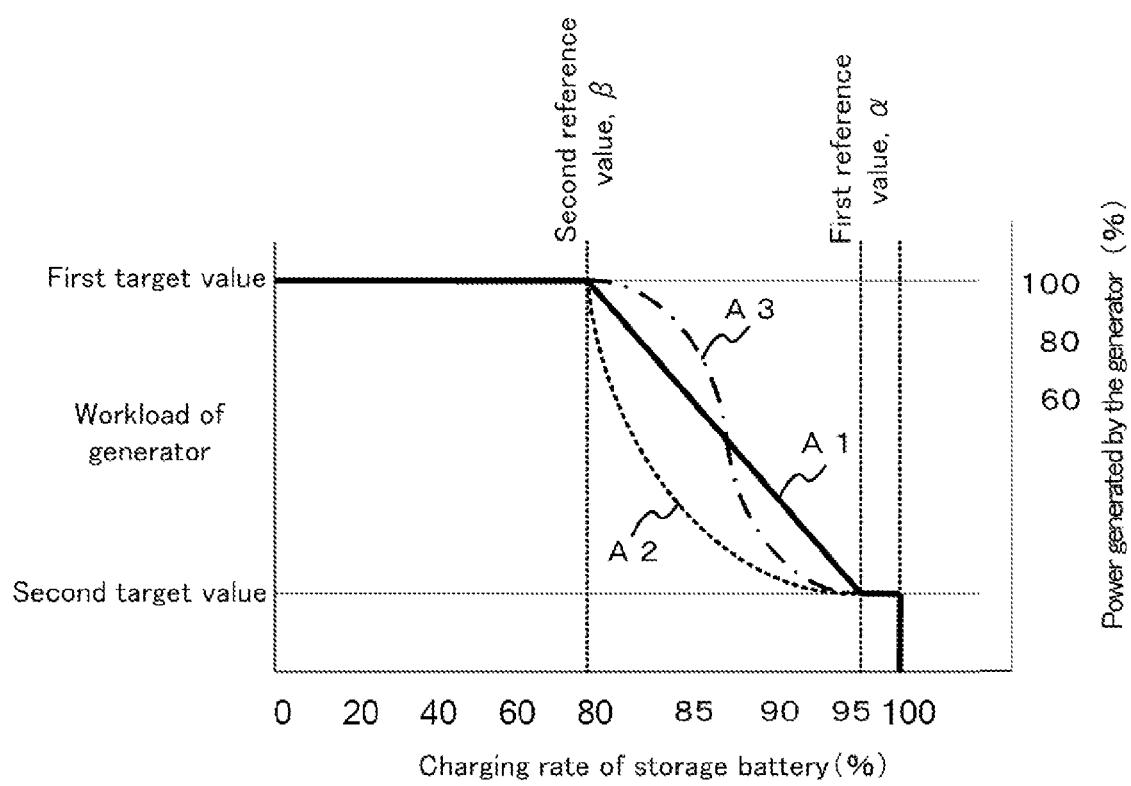
FIG. 4 is a view for explaining gradually decreasing functions A1 to A3 in which a charging rate of a storage battery serves as a parameter.

A method of gradually decreasing the power generation driving torque will be further described. Gradually decreasing functions A1 to A3 shown in FIG. 4 are each a function that gradually decreases the amount of work of the generator (or the amount of power generation of the generator) using the charging rate of the storage battery as a parameter. The gradually decreasing function A1 represents a function that decreases linearly and is practical because of a simple linear function. The gradually decreasing function A2 represents a function having a downward convex shape and is smoother in convergence to the second target value. The gradually decreasing function A3 is a function that suppresses a decrease at the beginning, increases the decrease at the middle, and smoothly converges to the second target value at the end.

Figure 5:
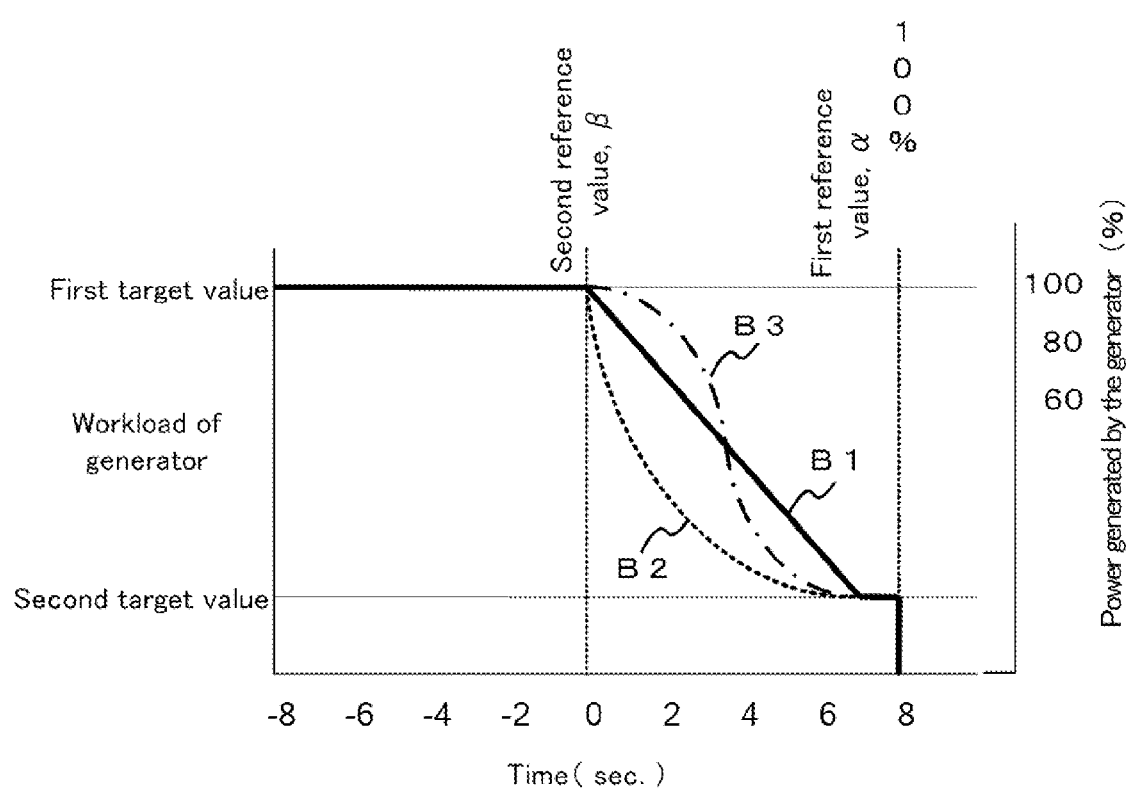
FIG. 5 is a view for explaining gradually decreasing functions B1 to B3 in which an elapsed time serves as a parameter.

Gradually decreasing functions B1 to B3 shown in FIG. 5 are each a function that uses an elapsed time as a parameter. The gradually decreasing function B1 represents a function that decreases linearly and is practical because of a simple linear function. The gradually decreasing function B2 represents a function having a downward convex shape and is smoother in convergence to the second target value. The gradually decreasing function B3 is a function which suppresses a decrease at the beginning, increases the decrease at the middle, and smoothly converges to the second target value at the end. Any and every function is set so as to decrease from the first target value to the second target value for approximately 8 sec.

According to the control of Embodiment 1, such a manner does not impinge on deceleration torque to the internal combustion engine and thus does not disturb acceleration of the vehicle. More specifically, according to the present invention, the storage battery is avoided from being overcharged, the power generation driving torque of the vehicular generator during deceleration of the vehicle stabilizes, and the influence on drivability of the driver can be suppressed to the minimum. This makes the power generation driving torque of the generator during deceleration of the vehicle become constant and stable with respect to the target value.

Figure 6:
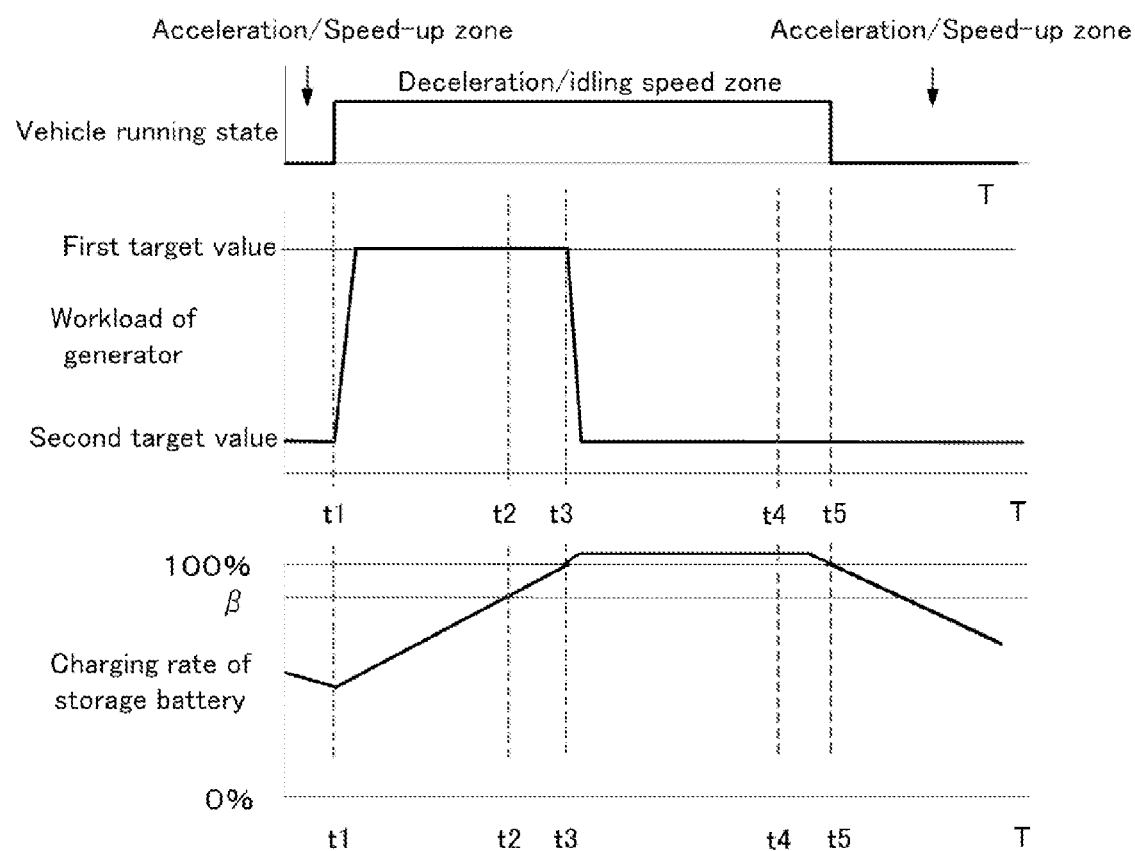
FIG. 6 is a view showing a time chart according to a comparative example.

In order to explain in contradistinction to the time chart according to Embodiment 1, a time chart in a vehicular charging system according to a comparative example is shown in FIG. 6. When the charging rate of the storage battery 2 is high, the amount of power supply to the storage battery 2 is small and an increase in the power generation driving torque of the generator 1 is small. On this occasion, when the power generation driving torque control unit 6a performs the increase command of the amount of power generation so that the actual value of the power generation driving torque is the target value of the power generation driving torque, the charging rate of the storage battery 2 is high; and thus, the storage battery 2 becomes an overcharge state.

According to the vehicular charging system 100 according to Embodiment 1, the charging rate of the storage battery 2 is always detected and the difference between the charging rate and the actual value during the full charge is detected, thereby being less than or equal to a predetermined difference; in other words, when the charging rate of the storage battery is upcoming to the full charge, a gradient of an increase in the amount of power generation of the generator is made to be gradual to prolong the time until reaching the full charge, whereby the power generation driving torque is avoided from being suddenly changed within one deceleration period.

Embodiment 2

Figure 7:
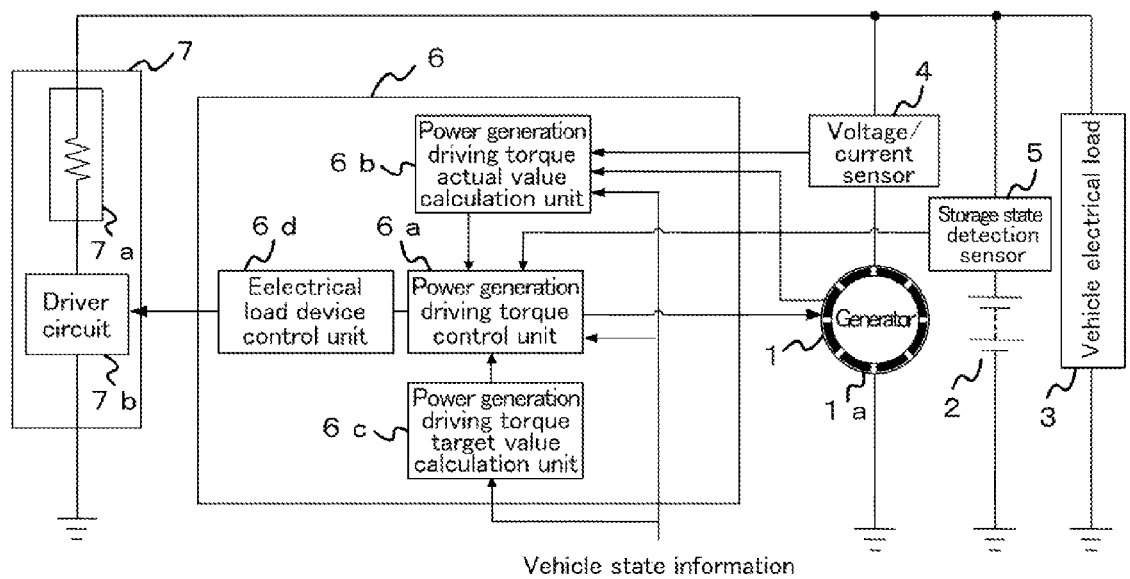
FIG. 7 is a view representing the whole configuration of a vehicular charging system according to Embodiment 2.

FIG. 7 shows a vehicular charging system 100 according to Embodiment 2 of the present invention. The generator 1 is equipped with a field coil 1a and is driven by an internal combustion engine of a vehicle via a belt. Power generation power is supplied from the generator 1 to a storage battery 2 and a vehicle electrical load 3. The vehicle electrical load 3 means: loads which are necessary for driving the vehicle and the internal combustion engine; and electrical loads in which a driver arbitrarily operates, for example, a head lamp and an air conditioner. A voltage/current sensor 4 is connected in series to the generator 1 in the vicinity of the generator 1 and monitors an output terminal voltage and an output current of the generator 1. Information monitored by the voltage/current sensor 4 is sent to a power generation driving torque control device 6. A storage state detection sensor 5 detects a charging rate of the storage battery 2 and sends the information to the power generation driving torque control device 6.

The power generation driving torque control device 6 is composed of a power generation driving torque control unit 6a, a power generation driving torque actual value calculation unit 6b, a power generation driving torque target value calculation unit 6c, and an electrical load device control unit 6d. The power generation driving torque control unit 6a monitors a running state of the vehicle from vehicle state information (the speed of the vehicle, an accelerator opening degree, the amount of stepping on brake, and the like). The power generation driving torque control unit 6a sends a command that increases the amount of power generation to the generator 1 during engine brake at which the driver does not step on an accelerator pedal and/or during transition to a deceleration mode in the case of decelerating the vehicle by stepping on a brake pedal.

The power generation driving torque actual value calculation unit 6b calculates an actual value of power generation driving torque of the generator 1 based on an energization current and a duty factor to the field coil 1a of the generator 1. At this time, the information from the voltage/current sensor 4, the rotation speed of the internal combustion engine (or the generator 1), or a temperature information value of the generator serves as one of calculation parameters; and thus, calculation accuracy of the actual value of the power generation driving torque is improved.

The power generation driving torque target value calculation unit 6c calculates a target value of the power generation driving torque from the information of the speed of the vehicle or the like, the target value being to be covered by the generator with respect to the internal combustion engine in each of the vehicle state. The power generation driving torque control unit 6a compares the actual value of the power generation driving torque with the target value and varies the amount of energization current to an electrical load device 7 by pulse width modulation (PWM) control via the electrical load device control unit 6d; and thus, power consumption at the electrical load device 7 is arbitrarily adjusted.

The electrical load device 7 is connected from a power supply line of the storage battery 2 and the generator 1 to the earth via a power consumption resistor 7a and a driver circuit 7b that can vary the amount of current thereof. The power consumption resistor 7a of the electrical load device 7 is arranged, for example, in the vicinity of the internal combustion engine so as not to be recognized by the driver. In the drawing, one electrical load device is controlled; however, naturally, expansion to control of a plurality of electrical load devices is easily assumed. A defogger or the like can be used for the power consumption resistor 7a. The defogger is a harness for removing dew condensation and/or frost from glass on an automobile and is also referred to as a defroster.

The power generation driving torque control unit 6a determines whether or not the vehicle transitions to a state in the deceleration mode from the vehicle state information, and performs the increase command of the amount of power generation to the generator 1 when the vehicle transitions to the deceleration mode. In order to increase the amount of power generation, there exist a method of increasing power generation voltage of the generator 1 and a method of directly increasing the amount of current flowing in the field coil of the generator 1. At this time, the power generation driving torque control unit 6a can know the charging rate of the storage battery 2 by the information from the storage state detection sensor 5.

When the charging rate of the storage battery 2 is low, the amount of power supply to the storage battery 2 is large; and accordingly, the power generation driving torque of the generator 1 naturally increases. Next, when the power generation driving torque increases and the actual value of the power generation driving torque from the power generation driving torque actual value calculation unit 6b is higher than the target value of the power generation driving torque, the power generation driving torque control unit 6a suppresses the amount of power generation of the generator 1.

When the charging rate of the storage battery 2 is high, the amount of power supply to the storage battery 2 is small and an increase in the power generation driving torque of the generator 1 is small. On this occasion, when the power generation driving torque control unit 6a performs the increase command of the amount of power generation so that the actual value of the power generation driving torque is the target value thereof, the charging rate of the storage battery 2 is high; and thus, the storage battery 2 becomes an overcharge state. Therefore, the electrical load device control unit 6d conducts the driver circuit 7b of the electrical load device 7 and carries current to the power consumption resistor 7a of the electrical load device 7 by the information from the power generation driving torque control unit 6a.

Control of the electrical load device 7 may be performed by simple ON/OFF control; however, if the control is performed by PWM control, the amount of power consumption can be adjusted more sensitively. Power is consumed by the electrical load device 7; and thus, the generator 1 needs to supply power to the electrical load device 7. As a result, the amount of power generation of the generator 1 increases and accordingly the power generation driving torque of the generator 1 also increases. The power generation driving torque control unit 6a increases the amount of energization current to the electrical load device 7 until the actual value of the power generation driving torque of the generator 1 reaches the target value thereof.

Figure 8:
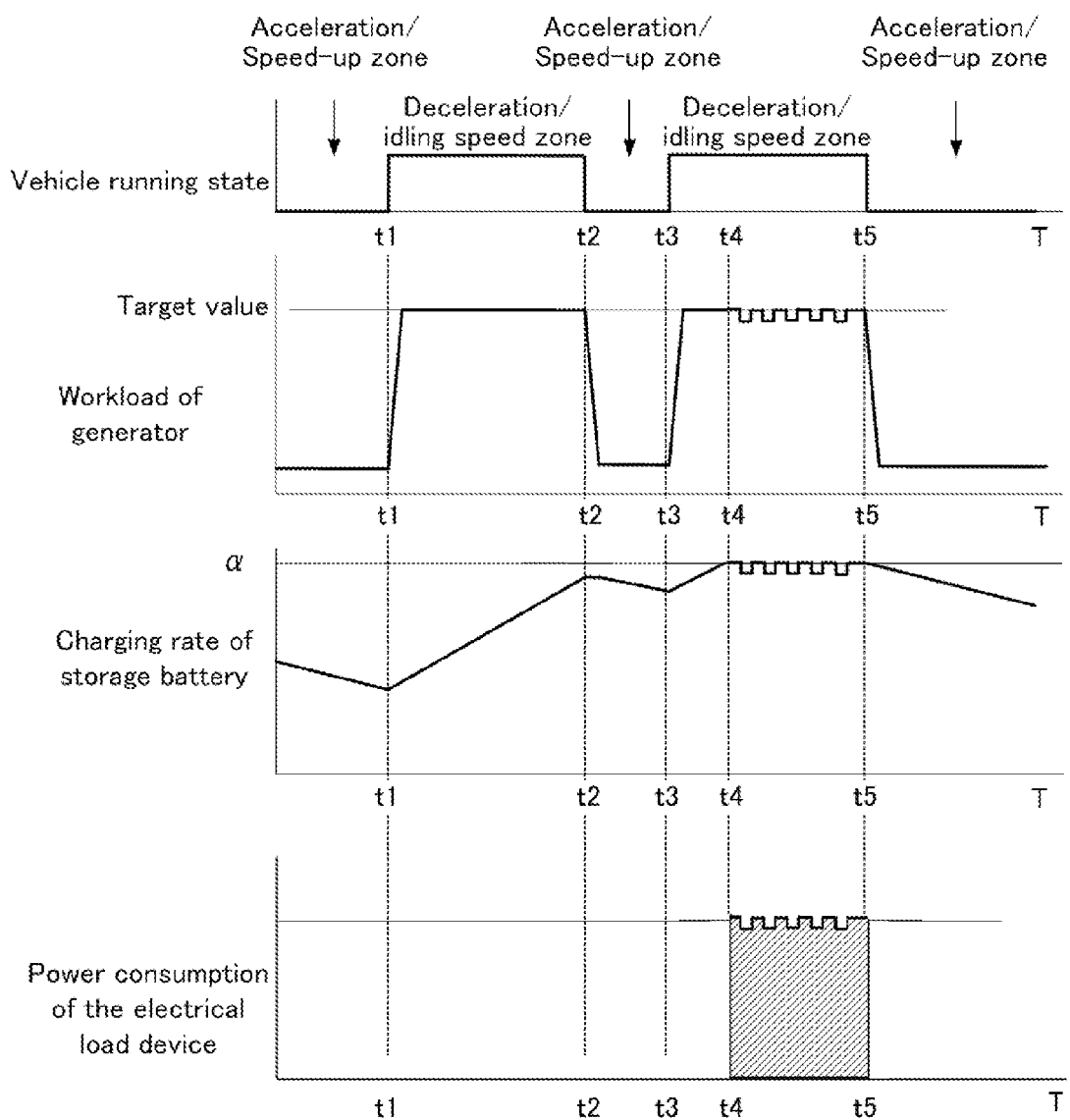
FIG. 8 is a view showing a time chart for explaining the role of the vehicular charging system according to Embodiment 2.

The above description will be specifically described with reference to FIG. 8. The amount of work of the generator correlates with the power generation driving torque of the generator. The vehicle transitions from an acceleration (or speed-up) zone to a deceleration (or idling speed) zone at a time t1. The charging rate of the storage battery at the time t1 is lower than a reference value α (in this case, 100%); and the power generation driving torque of the generator 1 naturally increases. After this, the vehicle transitions from the deceleration zone to the acceleration zone at a time t2 and transitions again from the acceleration zone to the deceleration zone at a time t3. A time at which the vehicle remains in the deceleration zone is short and therefore the charging rate at the time t2 does not reach the reference value α. The amount of work of the generator decreases to a constant value during from the time t2 to the time t3 and the charging rate also decreases.

The vehicle transitions to the deceleration zone during a period from the time t3 to a time t5. With an increase in the power generation driving torque of the generator 1, the charging rate of the storage battery begins to rise from the time t3 and reaches the reference value α at a time t4. When the charging rate reaches the reference value α, in order to avoid overcharge, the electrical load device control unit 6d conducts the driver circuit 7b of the electrical load device 7 by a command from the power generation driving torque control device 6 and carries current to the power consumption resistor 7a of the electrical load device 7 until the actual value of the power generation driving torque reaches the target value of the power generation driving torque. When the vehicle transitions from the deceleration zone to the acceleration zone at the time t5, the electrical load device control unit 6d decreases the amount of energization current, to the electrical load device 7.

Figure 9:
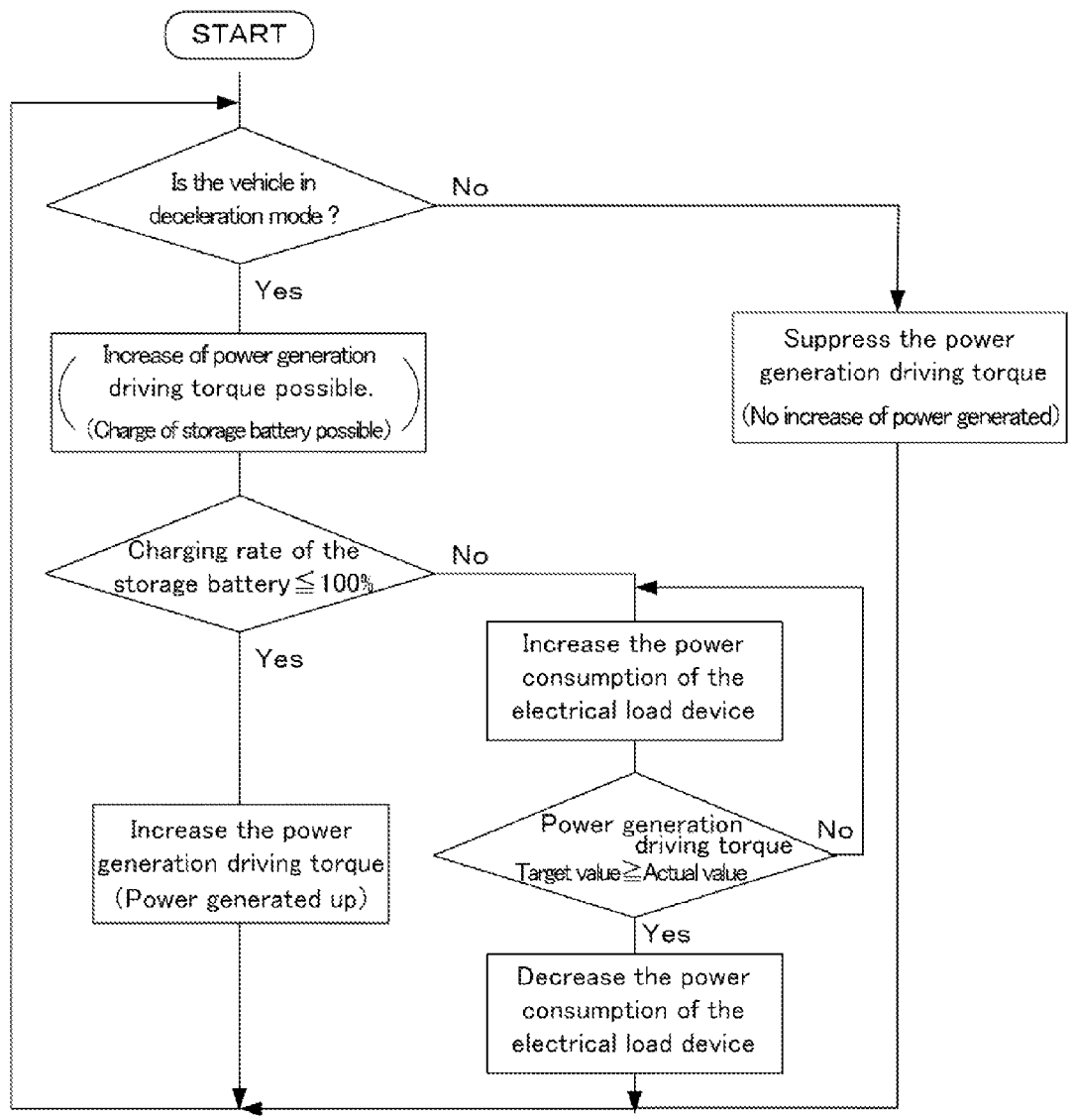
FIG. 9 is a view showing a flow chart according to Embodiment 2.

A flow chart according to Embodiment 2 is shown in FIG. 9. Except for the deceleration mode, the power generation driving torque control device 6 suppresses the amount of power generation of the generator 1. If the vehicle is in the deceleration mode, the power generation driving torque control device 6 increases the power generation driving torque to be in a state capable of charging the storage battery. If the storage battery is not in a full charge state (or if the charging rate is less than or equal to the reference value α), the power generation driving torque control device 6 increases the power generation driving torque. In the case of increasing the power generation driving torque, in order to effectively perform regenerative charging, the generator is preferable to be a full output state. If the storage battery is in the full charge state (or if the charging rate is equal to or more than the reference value α), the electrical load device 7 is made to operate. The electrical load device 7 operates so that the actual value of the power generation driving torque corresponds to the target value of the power generation driving torque.

Except for the deceleration mode, the power generation driving torque control device 6 suppresses the amount of power generation of the generator 1 and does not carry current to the electrical load device 7 at all. The power generation driving torque of the generator during deceleration of the vehicle becomes constant and stable with respect to the target value. Such a manner does not impinge on deceleration torque to the internal combustion engine and thus does not disturb acceleration of the vehicle. More specifically, according to the present invention, the storage battery is avoided from being overcharged, the power generation driving torque of the vehicular generator during deceleration of the vehicle stabilises, and the influence on drivability of the driver can be suppressed to the minimum.

Figure 10:
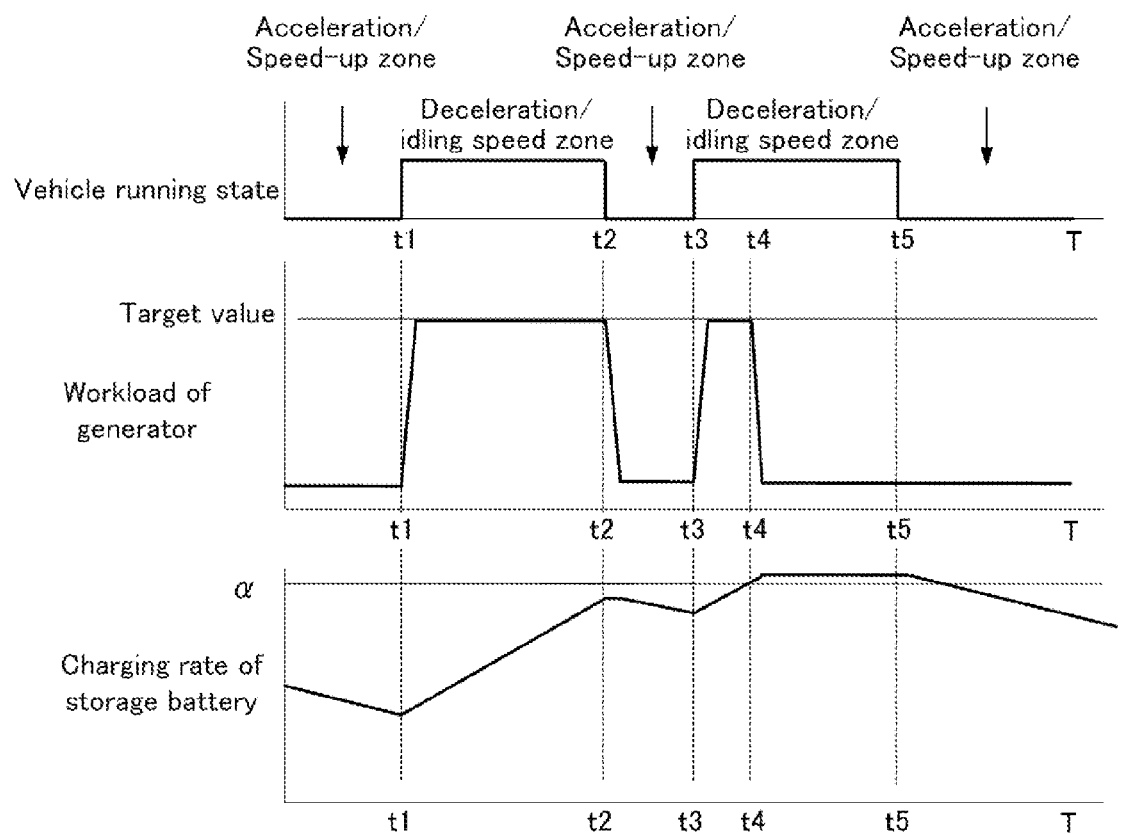
FIG. 10 is a view showing a time chart, according to a comparative example.

A time chart in a vehicular charging system according to a comparative example is shown in FIG. 10. When the charging rate of the storage battery 2 is high, the amount of power supply to the storage battery 2 is small and an increase in the power generation driving torque of the generator 1 is small. On this occasion, when the power generation driving torque control unit 6a performs the increase command of the amount of power generation so that the actual value of the power generation driving torque is the target value of the power generation driving torque, the charging rate of the storage battery 2 is high; and thus, the storage battery 2 becomes an overcharge state.

Embodiment 3

Figure 11:
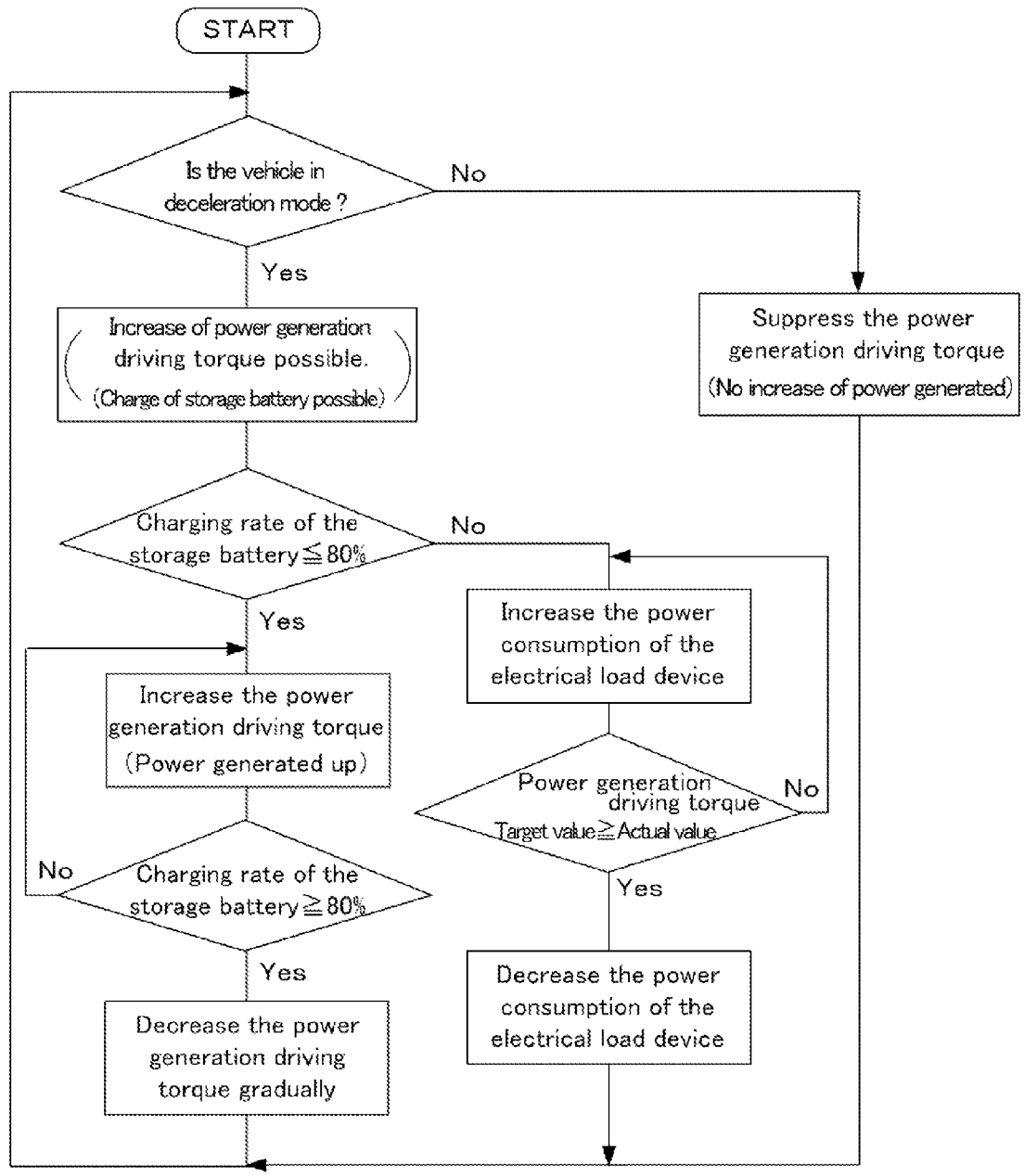
FIG. 11 is a view showing a flow chart according to Embodiment 3.

A flow chart according to Embodiment 3 is shown in FIG. 11. In this case, steps after determining whether or not charge of a storage battery is necessary are different from Embodiment 1. When a charging rate of the storage battery is higher than a reference value (for example, 100%), the amount of power consumption of an electrical load device 7 is made to increase as in Embodiment 2. Except for a deceleration mode, a power generation driving torque control device 6 suppresses the amount of power generation of a generator 1 and does not carry current to the electrical load device 7 at all. Power generation driving torque of the generator during deceleration of a vehicle becomes constant and stable with respect to a target value. In the deceleration mode, if the storage battery is in a full charge state (or if the charging rate is higher than a second reference value β), the electrical load device 7 is made to operate. The electrical load device 7 operates so that the actual value of the power generation driving torque corresponds to the target value of the power generation driving torque.

If the storage battery is not in the full charge state (or if the charging rate is lower than the second reference value β), the power generation driving torque is made to increase. In the case of increasing the power generation driving torque, in order to effectively perform regenerative charging, the generator is preferable to be a full output state. If the charging rate is higher than the second reference value β, power generation driving torque is made to gradually decrease. Such a manner does not impinge on deceleration torque to an internal combustion engine and thus does not disturb acceleration of a vehicle. More specifically, according to the present invention, the storage battery is avoided from being overcharged, the power generation driving torque of the vehicular generator during deceleration of the vehicle stabilizes, and the influence on drivability of a driver can be suppressed to the minimum.

Incidentally, the present invention can freely combine the embodiments and appropriately change in shape or omit the respective embodiments, within the scope of the present invention.

What is claimed is:

1. A vehicular charging system comprising:
   a generator which has a field coil and is mounted on a vehicle;
   a storage battery which stores power generated by said generator;
   a storage state detection sensor which detects a charge state of said storage battery; and
   a power generation driving torque control device which calculates an actual value of power generation driving torque of said generator from a duty factor with respect to said field coil, calculates a target value of the power generation driving torque of said generator from a running state of said vehicle, and controls said generator based on the calculated target value of the power generation driving torque,
   wherein said power generation driving torque control device controls said generator based on a first target value of the power generation driving torque when the running state of said vehicle moves into a deceleration mode, and decreases the power generation driving torque to control said generator based on a second target value of the power generation driving torque when the charge state of said storage battery reaches a reference value, the second target value being smaller than the first target value.

2. The vehicular charging system according to claim 1, further comprising an electrical load device which has a driver circuit and a resistor, and changes the magnitude of power consumption by operation of said driver circuit, and wherein said power generation driving torque control device controls said driver circuit of said electrical load device so that the actual value of the power generation driving torque corresponds to the first target value of the power generation driving torque when the running state of said vehicle is in the deceleration mode and the charge state of said storage battery exceeds the reference value.

3. The vehicular charging system according to claim 1, wherein the first target value of the power generation driving torque is set to be 100%.

4. The vehicular charging system according to claim 2, wherein the first target value of the power generation driving torque is set to be 100%.

5. A vehicular charging system comprising:
   a generator which has a field coil and is mounted on a vehicle;
   a storage battery which stores power generated by said generator;
   a storage state detection sensor which detects a charge state of said storage battery;
   an electrical load device which has a driver circuit and a resistor, and changes the magnitude of power consumption by operation of said driver circuit; and
   a power generation driving torque control device which calculates an actual value of power generation driving torque of said generator from a duty factor with respect to said field coil, calculates a target value of the power generation driving torque of said generator from a running state of said vehicle, and controls said driver circuit of said electrical load device based on the calculated target value of the power generation driving torque,
   wherein said power generation driving torque control device controls said driver circuit of said electrical load device so that the actual value of the power generation driving torque corresponds to the target value of the power generation driving torque when the running state of said vehicle is in a deceleration mode and the charge state of said storage battery reaches a reference value.

6. The vehicular charging system according to claim 5, wherein said electrical load device is made up of a defogger.

7. The vehicular charging system according to claim 5, wherein the reference value is set to be 100%.

8. The vehicular charging system according to claim 5, wherein the target value of the power generation driving torque is set to be 100%.

9. A vehicular charging system comprising:
   a generator which has a field coil and is mounted on a vehicle;
   a storage battery which stores power generated by said generator;
   a storage state detection sensor which detects a charge state of said storage battery; and
   a power generation driving torque control device which calculates an actual value of power generation driving torque of said generator from a duty factor with respect to said field coil, calculates a target value of the power generation driving torque of said generator from a running state of said vehicle, and controls said generator based on the calculated target value of the power generation driving torque,
   wherein said power generation driving torque control device controls said generator based on a first target value of the power generation driving torque when the running state of said vehicle moves into a deceleration mode, decreases the power generation driving torque to follow a gradually decreasing function using a charging rate as a parameter when the charge state of said storage battery reaches a reference value, and controls said generator based on a second target value of the power generation driving torque, the second target value being smaller than the first target value, wherein the gradually decreasing function, for power generation of the generator, has a downward convex shape against the charging rate, or suppresses a decrease in power generation of the generator at the beginning, increases the decrease at the middle, and smoothly converges to the second target value at the end.

10. A vehicular charging system comprising:
a generator which has a field coil and is mounted on a vehicle;
a storage battery which stores power generated by said generator;
a storage state detection sensor which detects a charge state of said storage battery; and
a power generation driving torque control device which calculates an actual value of power generation driving torque of said generator from a duty factor with respect to said field coil, calculates a target value of the power generation driving torque of said generator from a running state of said vehicle, and controls said generator based on the calculated target value of the power generation driving torque, wherein said power generation driving torque control device controls said generator based on a first target value of the power generation driving torque when the running state of said vehicle moves into a deceleration mode, decreases the power generation driving torque to follow a gradually decreasing function using an elapsed time as a parameter when the charge state of said storage battery reaches a reference value, and controls said generator based on a second target value of the power generation driving torque, the second target value being smaller than the first target value, wherein the gradually decreasing function, for power generation of the generator, has a downward convex shape against the elapsed time, or suppresses a decrease in power generation of the generator at the beginning, increases the decrease at the middle, and smoothly converges to the second target value at the end.

* * * * *